US007000379B2

(12) United States Patent
Makki et al.

(10) Patent No.: US 7,000,379 B2
(45) Date of Patent: Feb. 21, 2006

(54) FUEL/AIR RATIO FEEDBACK CONTROL WITH CATALYST GAIN ESTIMATION FOR AN INTERNAL COMBUSTION ENGINE

(75) Inventors: Imad Hassan Makki, Dearborn Heights, MI (US); James Michael Kerns, Trenton, MI (US); Stephen B. Smith, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 195 days.

(21) Appl. No.: 10/454,059

(22) Filed: Jun. 4, 2003

(65) Prior Publication Data

US 2004/0244363 A1   Dec. 9, 2004

(51) Int. Cl.
*F01N 3/00* (2006.01)
(52) U.S. Cl. .............................. 60/285; 60/274; 60/276; 701/109
(58) Field of Classification Search .................. 60/274, 60/276, 285, 299; 123/672, 674; 701/103, 701/109
See application file for complete search history.

(56) References Cited

U.S. PATENT DOCUMENTS

| 5,115,639 | A | | 5/1992 | Gopp |
| 5,359,852 | A | | 11/1994 | Curran et al. |
| 5,740,676 | A | * | 4/1998 | Agustin et al. ............... 60/276 |
| 5,743,084 | A | * | 4/1998 | Hepburn ....................... 60/274 |
| 6,073,073 | A | | 6/2000 | Kitamura et al. |
| 6,188,953 | B1 | * | 2/2001 | Yasui et al. .................. 701/109 |
| 6,253,541 | B1 | * | 7/2001 | Sullivan et al. ............... 60/274 |
| 6,253,542 | B1 | | 7/2001 | Omara et al. |
| 6,256,981 | B1 | * | 7/2001 | Sullivan et al. ............... 60/274 |
| 6,308,697 | B1 | | 10/2001 | Surnilla et al. |
| 6,311,680 | B1 | | 11/2001 | Bradley et al. |
| 6,314,723 | B1 | | 11/2001 | Ketterer et al. |
| 6,438,986 | B1 | * | 8/2002 | Beverly ....................... 62/310 |
| 6,539,707 | B1 | * | 4/2003 | Ikemoto et al. ............... 60/285 |
| 6,546,718 | B1 | * | 4/2003 | Hepburn et al. .............. 60/276 |

* cited by examiner

*Primary Examiner*—Thomas Denion
*Assistant Examiner*—Diem Tran
(74) *Attorney, Agent, or Firm*—Allan J. Lippa; Bir Law, PLC

(57) ABSTRACT

A system and method for controlling an internal combustion engine for low emissions include an inner feedback control loop to control the engine fuel/air ratio with feedback provided by a first exhaust gas sensor and an outer feedback control loop that modifies the fuel/air ratio reference provided to the inner feedback control loop based on feedback signals provided by the first exhaust gas sensor and a second exhaust gas sensor. The fuel/air ratio reference signal controller adapts to the oxygen storage capacity of the catalyst by modeling the catalyst as an integrator with an unknown gain and estimating the catalyst gain based on the first and second exhaust gas sensor signals. Using the estimated catalyst gain, an adaptive controller gain factor is determined and subsequently used to determine the fuel/air ratio reference signal provided to the fuel/air ratio controller of the inner feedback control loop.

24 Claims, 5 Drawing Sheets

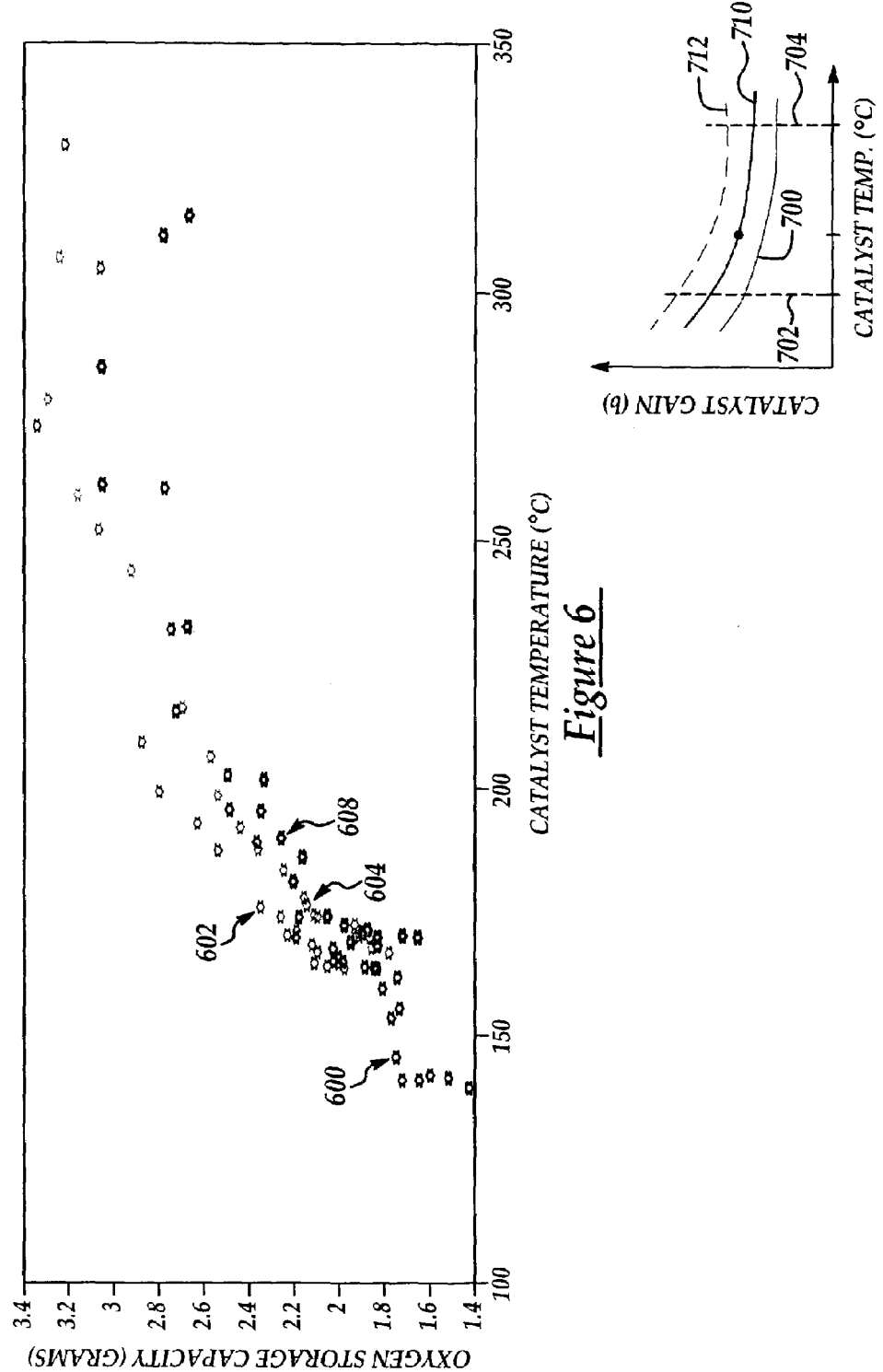

FUEL/AIR RATIO FEEDBACK CONTROL WITH CATALYST GAIN ESTIMATION FOR AN INTERNAL COMBUSTION ENGINE

CROSS-REFERENCE TO RELATED APPLICATIONS

This application is related to commonly owned, concurrently filed, and copending U.S. patent applications Ser. No. 10/454,329 titled Engine Control and Catalyst Monitoring With Downstream Exhaust Gas Sensors and Ser. No. 10/454,121 titled Engine Control and Catalyst Monitoring Based on Estimated Catalyst Gain, the disclosures of which are hereby incorporated by reference in their entirety.

BACKGROUND OF THE INVENTION

1. Field of the Invention

The present invention relates to a system and method for controlling an internal combustion engine.

2. Background Art

Internal combustion engines often employ advanced control strategies and after treatment systems to reduce tailpipe emissions. Conventional closed-loop feedback control strategies have been used to control the fuel/air ratio of the engine to balance engine performance, fuel economy, and emissions. When using an after treatment system that includes currently available exhaust gas catalysts, appropriate control of the engine fuel/air ratio is desired to manage the conversion efficiency of the catalyst for effective exhaust gas treatment. Feedback may be provided by one or more exhaust gas oxygen sensors that provide an indication of the current relative or absolute fuel/air ratio to the engine controller, which adjusts the commanded fuel/air ratio accordingly.

Robust management of catalyst conversion efficiency via fuel/air ratio control is complicated by the catalyst dynamics, which change with air flow rate, catalyst temperature, and catalyst age, for example. The catalyst dynamics are also significantly nonlinear, particularly with a new catalyst. Various engine and vehicle operating conditions, such as idling with a hot catalyst, also present challenges for the engine control system due to the extremely slow dynamics under these conditions.

To effectively control emissions while providing desirable performance and fuel economy, the present inventors have recognized that the engine controller may incorporate a robust catalyst model that is relatively simple but still represents the catalyst operating dynamics under a broad range of engine and vehicle operating conditions.

SUMMARY OF THE INVENTION

The present invention provides a system and method for controlling an internal combustion engine that include an inner feedback control loop to control the engine fuel/air ratio with feedback provided by a first exhaust gas sensor and an outer feedback control loop that modifies the fuel/air ratio reference provided to the inner feedback control loop based on feedback signals provided by the first exhaust gas sensor and a second exhaust gas sensor. The fuel/air ratio reference signal controller adapts to the oxygen storage capacity of the catalyst by modeling the catalyst as a nonlinear integrator with an unknown adaptive gain and estimating the catalyst gain based on the first and second exhaust gas sensor signals. An adaptive controller gain factor is then determined based on the estimated catalyst gain and is then used to determine the fuel/air ratio reference signal.

In one embodiment, the first exhaust gas sensor is a sensor that provides an indication of the absolute fuel/air ratio, such as a universal exhaust gas oxygen sensor (UEGO), and is positioned upstream relative to the catalyst. The second exhaust gas sensor provides an indication of a relative fuel/air ratio, such as a heated exhaust gas oxygen sensor (HEGO), and is positioned downstream relative to the first sensor and at least a portion of the catalyst. In this embodiment, the outer feedback control loop modifies the fuel/air ratio reference signal provided to the inner feedback control loop to maintain the voltage of the second exhaust gas sensor within a predetermined range of a desired reference value.

Embodiments of the present invention include a catalyst model and controller within the outer feedback control loop. The catalyst model determines online how the dynamics of the catalyst are changing by modeling the catalyst dynamics from feedgas to the second exhaust gas sensor as an integrator with an unknown gain. The catalyst gain may be determined by any of a variety of estimation techniques, such as a recursive least squares approach, for example. Estimation of the catalyst gain provides for adaptive determination of the fuel/air ratio reference signal provided to the inner feedback control loop to control the limit cycles amplitude of the second exhaust gas sensor.

In general, the present invention adapts the fuel/air ratio controller to the changing oxygen storage capacity of the catalyst. The engine controller modulates the fuel/air ratio between limits set by a relay block within the outer loop controller as adjusted by an adaptive gain factor based on the estimated catalyst gain. The relay block switches between predetermined offset values of the fuel/air ratio reference depending on the sign of the error between the second exhaust gas sensor and its associated reference value, with the resulting fuel/air ratio reference provided to the inner loop controller.

The present invention provides a number of advantages. For example, the present invention provides a more robust engine controller that adapts to changing catalyst dynamics on-line. The invention allows use of a relatively simple catalyst model that sufficiently captures the catalyst behavior to provide on-line calculation of the catalyst gain for real-time updates in the engine controller. The robust control and management of catalyst conversion efficiency afforded by the present invention may allow reduction of the catalyst volume with corresponding savings in cost and weight.

The above advantages and other advantages, objects, and features of the present invention will be readily apparent from the following detailed description of the preferred embodiments when taken in connection with the accompanying drawings.

BRIEF DESCRIPTION OF THE DRAWINGS

FIG. 6 is a graph of catalyst oxygen storage capacity as a function of catalyst temperature for use in monitoring catalyst performance according to one embodiment of the present invention;

FIG. 7 is a graph of catalyst gain as a function of catalyst temperature for use in monitoring catalyst performance according to one embodiment of the present invention.

DETAILED DESCRIPTION OF THE PREFERRED EMBODIMENT(S)

Figure 1:
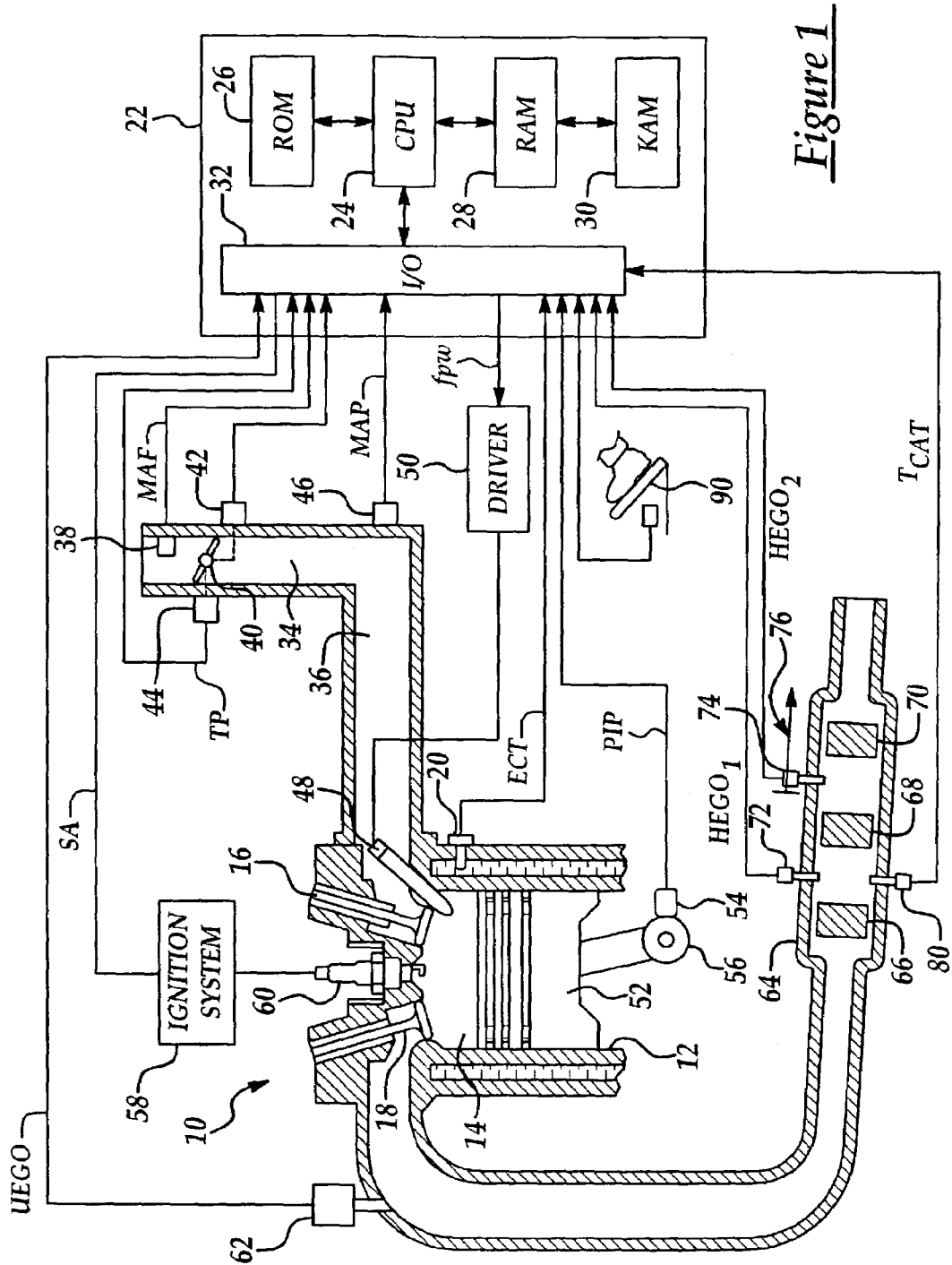
FIG. 1 is a block diagram of a representative embodiment of a system or method for controlling an internal combustion engine according to the present invention.

The present invention relates to a control strategy for controlling and monitoring operation of an internal combustion engine to effectively manage catalyst conversion efficiency under various engine, vehicle, and catalyst operating conditions. As will be appreciated by those of ordinary skill in the art, the various controllers referred to in describing the present invention are preferably implemented by software, code, or instructions executed by a microprocessor based engine, vehicle, or powertrain controller.

Embodiments of the invention use an inner feedback control loop for fuel/air ratio control and an outer feedback control loop that provides an fuel/air ratio reference value to the inner feedback control loop. The outer loop includes an adaptive controller that adapts to the estimated oxygen storage capacity of the catalyst, exerting more control effort while the catalyst exhibits a large degree of oxygen storage, while reducing control effort under higher engine loads or after the catalyst has aged significantly and exhibits less oxygen storage capacity. The estimated catalyst gain determined on-line in real-time by the engine controller may also be used to determine the catalyst performance.

The representative embodiments used to illustrate and describe the invention relate generally to an internal combustion engine control system. While the present invention is described with reference to a spark-ignited, direct injection internal combustion engine having electronic throttle control and conventional cam timing, the invention is independent of the particular engine technology and may be used in a wide variety of applications.

System 10 includes an internal combustion engine having a plurality of cylinders, represented by cylinder 12, having corresponding combustion chambers 14. As one of ordinary skill in the art will appreciate, system 10 includes various sensors and actuators to effect control of the engine. One or more sensors or actuators may be provided for each cylinder 12, or a single sensor or actuator may be provided for the engine. For example, each cylinder 12 may include four actuators that operate intake valves 16 and exhaust valves 18. However, the engine may include only a single engine coolant temperature sensor 20.

System 10 preferably includes a controller 22 having a microprocessor 24 in communication with various computer-readable storage media. The computer readable storage media preferably include a read-only memory (ROM) 26, a random-access memory (RAM) 28, and a keep-alive memory (KAM) 30. The computer-readable storage media may be implemented using any of a number of known temporary and/or persistent memory devices such as PROMs, EPROMs, EEPROMs, flash memory, or any other electric, magnetic, optical or combination memory capable of storing data, code, instructions, calibration information, operating variables, and the like used by microprocessor 24 in controlling the engine. Microprocessor 24 communicates with the various sensors and actuators via an input/output (I/O) interface 32.

In operation, air passes through intake 34 where it may be distributed to the plurality of cylinders via a discrete or integrated intake manifold, indicated generally by reference numeral 36. System 10 preferably includes a mass airflow sensor 38 that provides a corresponding signal (MAF) to controller 22 indicative of the mass airflow. A throttle valve 40 is used to modulate the airflow through intake 34. Throttle valve 40 is preferably electronically controlled by an appropriate actuator 42 based on a corresponding throttle position signal generated by controller 22. The throttle position signal may be generated in response to a corresponding engine output or torque requested by an operator via accelerator pedal 90 and current engine and/or vehicle operating conditions. A throttle position sensor 44 provides a feedback signal (TP) to controller 22 indicative of the actual position of throttle valve 40 to implement closed loop control of throttle valve 40.

A manifold absolute pressure sensor 46 is used to provide a signal (MAP) indicative of the manifold pressure to controller 22. Air passing through intake manifold 36 enters combustion chamber 14 through appropriate control of one or more intake valves 16. For variable cam timing applications, intake valves 16 and exhaust valves 18 may be controlled directly or indirectly by controller 22 using electromagnetic actuators or a variable cam timing (VCT) device, for example. Alternatively, intake valves 16 and exhaust valves 18 may be controlled using a conventional camshaft arrangement (not shown). A fuel injector 48 injects an appropriate quantity of fuel in one or more injection events for the current operating mode based on a signal (FPW) generated by an fuel/air ratio controller implemented by controller 22, which is then processed by driver 50. Fuel signal (FPW) is controlled to provide a desired fuel/air ratio within combustion chamber 14 as described in greater detail below.

As illustrated in FIG. 1, fuel injector 48 injects an appropriate quantity of fuel in one or more injections directly into combustion chamber 14, or into an intake port for port-injected applications. Control of the fuel injection events is generally based on the position of piston 52 within cylinder 12. Position information is acquired by an appropriate sensor 54, which provides a position signal (PIP) indicative of rotational position of crankshaft 56.

At the appropriate time during the combustion cycle, controller 22 generates a spark signal (SA) that is processed by ignition system 58 to control spark plug 60 and initiate combustion within chamber 14. Controller 22 (or a conventional camshaft) controls one or more exhaust valves 18 to exhaust the combusted fuel/air mixture through an exhaust manifold. An exhaust gas oxygen sensor 62, which is preferably capable of providing a signal proportional to the amount of oxygen in the exhaust gas, such as a universal exhaust gas oxygen sensor (UEGO), for example, provides a signal (UEGO) indicative of the oxygen content of the feedgas to controller 22. This signal may be used to adjust the fuel/air ratio, or control the operating mode of one or more cylinders, for example, as described in greater detail below. The exhaust gas is passed through an integrated or discrete exhaust manifold and one or more integrated or discrete catalysts represented by catalyst 64 before being exhausted to atmosphere. Preferably, one or more of the integrated or discrete catalysts are three-way catalysts (TWC) as well known in the art.

As shown in FIG. 1, each catalyst 64 may include one or more catalyst elements or bricks 66, 68, and 70. While each of the catalyst elements 66, 68, and 70 are illustrated as being contained within a single catalytic device 64, one or more of the catalyst elements may be contained in separate housings or devices depending upon the particular application. For example, a close-coupled or fast light-off catalyst may include a housing and a single catalyst element positioned as near to one or more exhaust ports as packaging considerations allow. Additional catalyst elements or bricks may be contained in one or more downstream housings or devices, such as an under-body device. In addition, the various cylinders 12 of engine 10 may be grouped in one or more banks each having two or more associated cylinders that share a particular exhaust stream such that each exhaust stream or bank has associated catalyst(s) and corresponding exhaust gas sensors. Those of ordinary skill in the art will recognize that the present invention may be used in a variety of system configurations relative to positioning of one or more catalyst elements and corresponding exhaust gas sensors.

In one embodiment of the present invention, a secondary exhaust gas sensor 72 is positioned downstream relative to first exhaust gas sensor 62 and at least one catalyst element 66 (or a portion thereof). For example, for applications employing a close-coupled catalyst, sensor 72 may be positioned downstream of the close-coupled catalyst and upstream of an under-body catalyst. Alternatively, sensor 72 may be positioned downstream of the first or second catalyst elements in a multi-element (multiple brick) catalyst as representatively illustrated in FIG. 1. Secondary exhaust gas sensor 72 provides a signal indicative of a relative fuel/air ratio by detecting excess oxygen in the exhaust stream. Sensor 72 is preferably a heated exhaust gas oxygen sensor (HEGO) that provides a corresponding signal $HEGO_1$ used by controller 22 for feedback control in an attempt to maintain a predetermined sensor voltage, indicative of a desired catalyst performance as described in greater detail below.

In an alternative embodiment, a third exhaust gas sensor 74 is positioned downstream relative to the second exhaust gas sensor 72 and one or more additional catalyst elements 68, 70. Potential positioning of third sensor 74 is indicated generally by arrow and line 76. Third exhaust gas sensor 74 is also preferably a HEGO sensor that provides a corresponding signal $HEGO_2$ to controller 22 for use in monitoring performance of catalyst 64 and/or controlling engine fuel/air ratio as described in greater detail below.

As also shown in FIG. 1, a catalyst temperature sensor 80 may be provided to provide a signal $T_{CAT}$ corresponding to current catalyst temperature to controller 22 for use in controlling engine 10 and/or monitoring performance of catalyst 64. Alternatively, catalyst temperature may be estimated or inferred from various other engine and/or vehicle operating parameters as known in the art.

As illustrated and described in greater detail below, controller 22 includes an inner feedback control loop to control the engine fuel/air ratio by generating an appropriate fuel command (fpw). A feedback signal (UEGO) for the inner control loop is provided to controller 22 by exhaust gas sensor 62. An outer feedback control loop also implemented by controller 22 is used to generate an fuel/air ratio reference signal provided to the inner feedback control loop with feedback signals provided by exhaust gas sensor 62 and exhaust gas sensor 72. In one embodiment, the outer loop controller (also referred to as an fuel/air ratio reference signal controller) uses feedback signals from exhaust gas sensors 62, 72, and 74 to generate an appropriate fuel/air ratio reference signal. The fuel/air ratio reference signal controller implemented by controller 22 adapts to the oxygen storage capacity of catalyst 64 by modeling the catalyst as an integrator with an unknown gain and estimating the catalyst gain based on the feedback signals $HEGO_1$ and UEGO provided by sensors 72 and 62, respectively. An adaptive controller gain factor is then determined based on the estimated catalyst gain and is then used by the outer loop controller to determine the fuel/air ratio reference signal provided to the inner loop controller.

Figure 2:
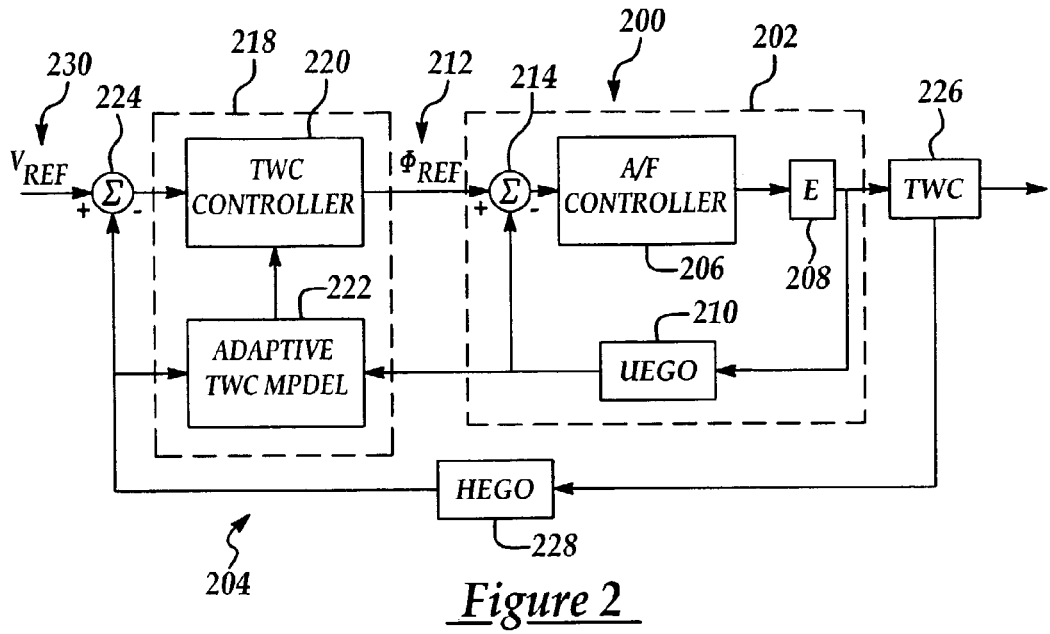
FIG. 2 is a block diagram illustrating inner and outer control loops for a representative engine control strategy according to one embodiment of the present invention.

FIG. 2 is a block diagram illustrating the inner and outer feedback control loops for a representative engine control strategy implemented by an engine controller, such as controller 22 (FIG. 1) according to one embodiment of the present invention. Controller 200 includes an inner feedback control loop 202 and an outer feedback control loop indicated generally by reference numeral 204. Inner loop 202 includes an fuel/air ratio controller 206 that is a proportional-integral-derivative (PID) controller that generates an appropriate fuel command provided to the injectors of engine 208. UEGO sensor 210 provides a feedback signal proportional to the oxygen content of the feedgas or engine exhaust between the engine and the three-way catalyst (TWC) 226. The feedback signal is combined with an fuel/air ratio reference signal ($N_{REF}$) 212 generated by outer feedback control loop 204 at block 214. The error or difference signal provided by block 214 is then used by controller 206 to adjust the fuel command so that the actual fuel/air ratio within engine 208 approaches the desired fuel/air ratio.

Inner feedback control loop 202 was designed using a traditional control system design approach. After specifying the transfer function of a representative engine based on the operating conditions and frequency range of interest, the A/F controller characteristics were specified. Loop shaping was used to modify the magnitude and phase of the frequency response to provide a desired performance. The inventors herein recognized that the bandwidth of the engine increases with both speed and load such that engine idle conditions are generally the worst-case dynamics from a robustness standpoint. Therefore, the dynamics from the fuel pulse width (fpw) command provided to engine 208 to UEGO sensor 210 under engine idle operating conditions provide the worst-case stability margins throughout the engine operating range. The specifications for A/F controller 206 can therefore be determined from the transfer function estimate at idle while providing stability throughout the engine operating range.

Outer feedback control loop 204 includes an fuel/air ratio reference controller, indicated generally by reference numeral 218, that generates an fuel/air ratio reference signal 212 supplied to inner feedback control loop 202. Fuel/air ratio reference controller 218 includes a catalyst controller 220, preferably a PID controller, and an adaptive catalyst model 222. Catalyst controller 220 monitors and controls conversion efficiency of three-way catalyst 226 by modulating the fuel/air ratio reference signal 212 based on a feedback signal provided by HEGO sensor 228 and adaptive catalyst model 222. The feedback signal generated by HEGO sensor 228 is compared to a voltage reference a reference voltage ($V_{REF}$) 230 to generate a difference or error signal at block 224. Controller 220 attempts to reduce the error or difference signal toward zero to maintain the voltage of HEGO sensor 228 close to its desired value as specified by reference voltage 230.

Adaptive catalyst model 222 determines online how the dynamics of the three-way catalyst 226 are changing. The model assumes that the dynamics from the feedgas as detected by UEGO sensor 210 to the position of HEGO sensor 228 positioned downstream relative to at least a portion of the catalyst can be modeled by an integrator with an unknown gain recognizing that the output signal of HEGO sensor 228 will be attenuated by the oxygen storage of catalyst 226, i.e.:

$$Hego(t)=\int b^{*}Uego(t)dt$$

where Hego(t) represents the (output) signal generated by HEGO sensor 228, b represents the unknown catalyst gain, and UEGO(t) represents the (input) signal generated by UEGO sensor 210. As such, the catalyst gain, b, can be determined or estimated based on the input (UEGO) and output (HEGO) signals using any of a variety of known estimation techniques, such as recursive least squares, for example. In one embodiment, the catalyst gain is estimated by a gradient method using pre-filters to avoid differentiation of the measured sensor signals.

The catalyst gain inversely correlates with the current oxygen storage capacity of the catalyst. As such, a high value for the catalyst gain indicates low oxygen storage capacity of the portion of the catalyst 226 upstream of HEGO sensor 228. Estimating the catalyst gain online provides an indication of how the dynamics of the catalyst are changing and allows adaptation of the generated fuel/air ratio reference signal provided to the inner loop 202 in response to the changing catalyst dynamics. In general, more control effort can be used to control the state of catalyst 226 when catalyst 226 exhibits a large degree of oxygen storage, i.e. larger changes in the fuel/air ratio reference are used. When the degree of oxygen storage is lessened, such as under higher engine loads or after the catalyst has aged significantly, the control effort is decreased.

Figure 3:
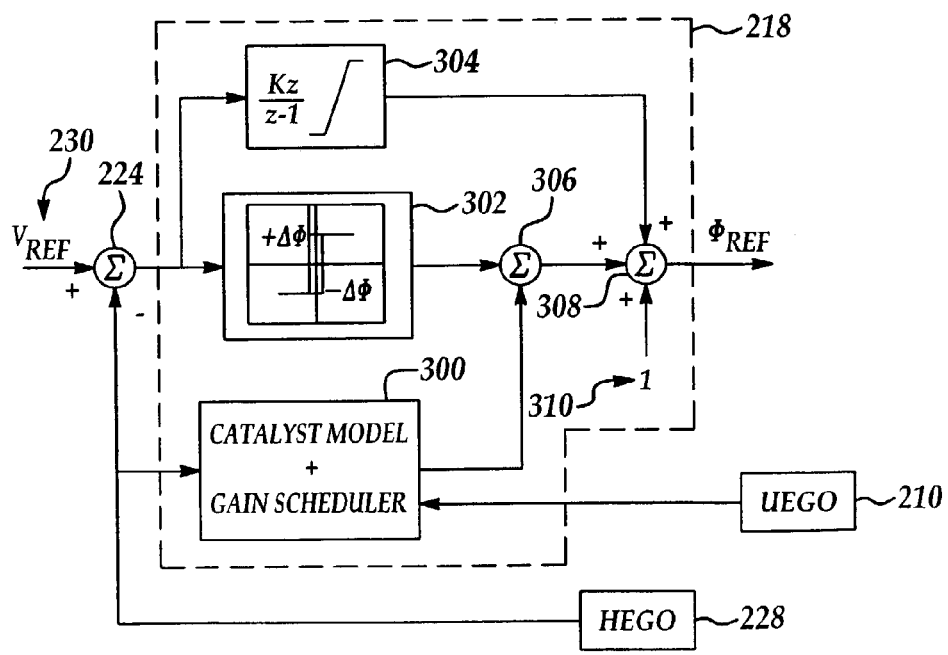
FIG. 3 is a block diagram illustrating a modified self-oscillating adaptive system (SOAS) for use in controlling an internal combustion engine according to one embodiment of the present invention.

FIG. 3 is a block diagram illustrating a modified self-oscillating adaptive system (SOAS) implementation of an fuel/air ratio reference signal controller according to one embodiment of the present invention. The modified SOAS 218 includes a catalyst model and gain scheduler 300 that receives inputs from UEGO sensor 210 and at least one HEGO sensor 228. Block 300 determines a catalyst gain using an appropriate catalyst model and then determines or schedules an adaptive gain based on the catalyst gain. In one embodiment, the adaptive gain is determined using a look-up table indexed or accessed by the estimated catalyst gain (see FIG. 4). The adaptive gain is multiplied by the output of a relay block 302 at block 306 with the result combined at block 308 with a feed-forward term that passes through a saturating integrator 304 with a small proportional gain so the integrator does not contribute to any limit cycle behavior. Relay block 302 generates a predetermined offset (+/−)N) in fuel/air ratio reference depending on the sign of the error between the signal from HEGO 228 and reference voltage 230 as determined by block 224. In one embodiment, reference voltage 230 is 0.6 volts but may vary depending upon the particular type of exhaust gas sensor and the particular application. Relay block 302 may include appropriate hysteresis depending upon the particular application and implementation. Saturating integrator 304 is used to compensate for any constant offsets or errors in measurements of the feedgas fuel/air ratio, such as those that may occur due to sensor bias or drift.

The fuel/air ratio offset generated by relay block 302 is modified by the adaptive gain at block 306 before being combined with the feed-forward term and a target fuel/air ratio (preferably a fuel/air ratio relative to a stoichiometric ratio, unity in this example) at block 308 to generate the fuel/air ratio reference signal ($N_{REF}$) provided to the inner loop air/fuel ratio controller (206, FIG. 2). In general, this feedback control strategy modulates the fuel/air ratio between limits determined by relay block 302 as adjusted by the adaptive gain at block 306. The primary mechanism for downstream exhaust gas sensor feedback is the relay that switches to a predetermined offset in fuel/air ratio reference depending on the sign of the error or difference between the exhaust gas sensor reference, typically in the range of 0.6 to 0.7 volts, and the measured value.

Figure 4:
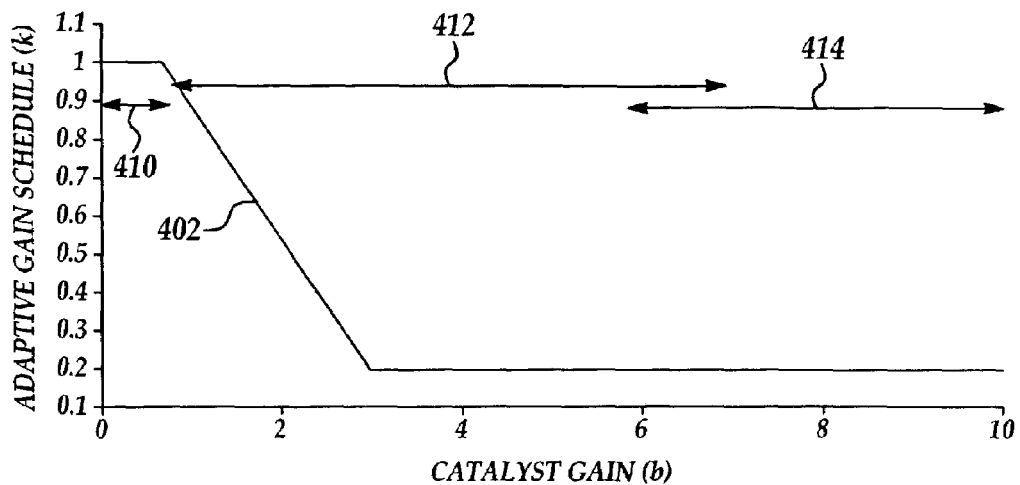
FIG. 4 is a graph of an adaptive gain factor as a function of an estimated catalyst gain that may be implemented as a look-up table for use in controlling an internal combustion engine according to one embodiment of the present invention.

FIG. 4 is a graph of an adaptive gain factor as a function of an estimated catalyst gain that may be implemented as a look-up table for use in controlling an internal combustion engine according to one embodiment of the present invention. A function representing an estimated catalyst gain (b) and a corresponding adaptive gain factor (k) is plotted. This function is used to populate a look-up table with values as represented by line 402 that are stored in persistent memory for access by the engine controller in controlling the engine. As describe above, an estimated catalyst gain (b) is determined based on a catalyst model and inputs from the exhaust gas sensors. The estimated catalyst gain (b) is then used to access or index a look-up table to determine a corresponding adaptive gain factor (k) that is multiplied by the output of the relay block in the outer loop (fuel/air ratio reference) controller. As can be seen from the representative relationship between the catalyst gain (b) and adaptive gain factor (k) illustrated by line 402 of FIG. 4, the adaptive gain factor preferably does not exceed unity and generally decreases with increasing catalyst gain to reduce the control effort via reducing the effect of the relay block (fuel/air ratio offset) when the catalyst is responding easily and quickly to changes in fuel/air ratio, i.e. when the catalyst is exhibiting reduced oxygen storage. Likewise, when the catalyst is exhibiting increased oxygen storage (corresponding to reduced catalyst gain), the adaptive gain factor is closer to or equal to unity.

Arrows 410, 412, and 414 of FIG. 4 indicate representative values for catalyst gain and corresponding adaptive gain for operating conditions that may result in varying catalyst oxygen storage. Region 410 may correspond to hot idling conditions with a green catalyst with region 412 corresponding to operation under higher engine speeds and/or loads. Region 414 would generally indicate a significantly aged catalyst.

Figure 5:
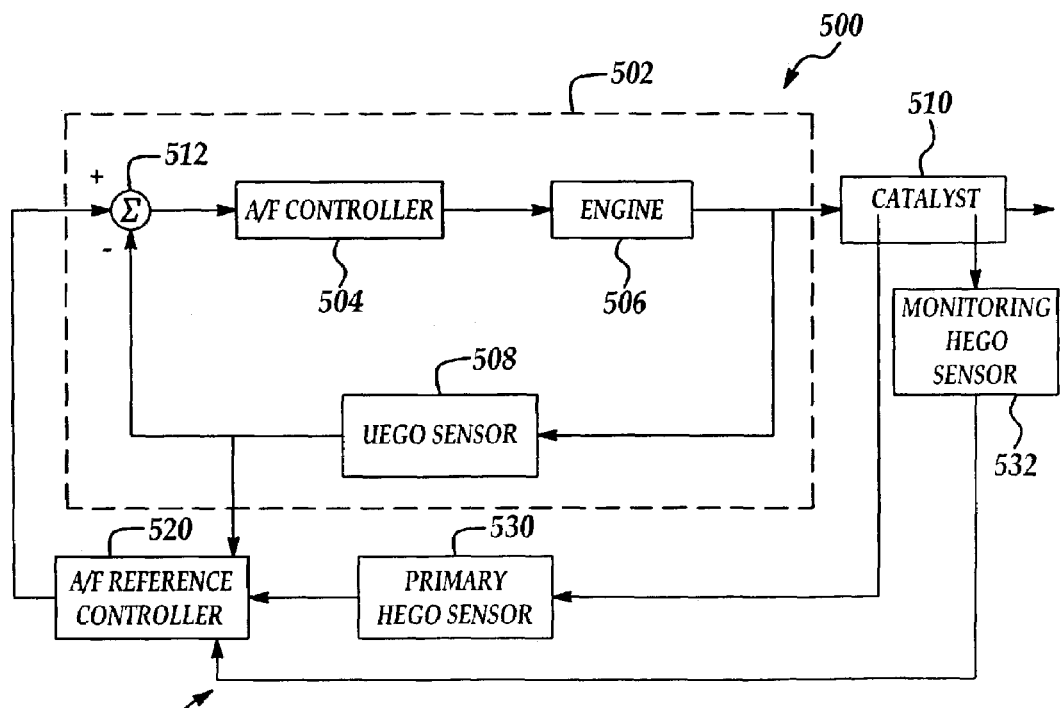
FIG. 5 is a block diagram illustrating an alternative embodiment for an engine controller having an additional downstream exhaust gas oxygen sensor used for engine control and/or diagnostics according to one embodiment of the present invention.

FIG. 5 is a block diagram illustrating an alternative embodiment for an engine controller having an additional downstream exhaust gas oxygen sensor used for engine control and/or diagnostics according to one embodiment of the present invention. Control strategy 500 includes an inner feedback control loop 502 that includes a PID air/fuel controller 504 that generates a fueling command for engine 506 to control the air/fuel ratio with feedback provided by a first exhaust gas sensor 508 that provides an indication of the actual air/fuel ratio. In one embodiment, first exhaust gas sensor 508 provides a signal proportional to the oxygen content of the feedgas, i.e. the exhaust downstream of engine 506 and upstream of any catalyst 510. First exhaust gas sensor may be implemented by a UEGO sensor, for example. The signal generated by first exhaust sensor 508 is compared at block 512 to a reference air/fuel ratio generated by an air/fuel ratio reference controller 520 contained within an outer control loop indicated generally by reference numeral 522. Air/fuel ratio controller 504 adjusts the fuel command to reduce the error or difference as provided by block 512.

Air/fuel ratio reference controller 520, which is preferably a PID controller, receives feedback from a second exhaust gas sensor 530 positioned downstream relative to first exhaust gas sensor 508 and at least a portion of catalyst 510. As described above, catalyst 510 may include multiple catalyst elements or bricks within a single housing. Alternatively, or in combination, one or more discrete catalyst devices may be employed, such as a close-coupled or fast light-off catalyst and an underbody catalyst, for example. Second exhaust gas sensor 530, implemented by a primary HEGO sensor in this representative embodiment, is positioned after the fast light-off catalyst or after the first brick or element of a multi-element catalyst and provides a corresponding signal indicative of a relative air/fuel ratio to air/fuel ratio reference controller 520. At least one additional exhaust gas sensor 532, referred to as a monitoring HEGO sensor in this embodiment, is positioned downstream relative to primary HEGO sensor 530 and an additional portion, element, or brick of catalyst 510. Monitoring HEGO sensor 532 provides a corresponding feedback signal indicative of a relative air/fuel ratio to air/fuel ratio reference controller 520.

Air/fuel ratio reference controller 520 may be used to monitor and control the conversion efficiency of catalyst 510 in combination with air/fuel ratio controller 504 by generating an appropriate air/fuel ratio reference, and monitoring the performance of catalyst 510 based on the change of an estimated catalyst gain. Air/fuel ratio reference controller 520 determines an estimated catalyst gain based on a corresponding catalyst model and inputs from UEGO sensor 508, primary HEGO sensor 530, and/or monitoring HEGO sensor 532. In one embodiment, air/fuel ratio reference controller 520 operates to control the difference between the voltages of the primary HEGO sensor 530 and the monitoring HEGO sensor 532 based on a corresponding reference voltage to compensate for the changing conditions of the catalyst, such as aging, lack of oxygen storage, and others. Alternatively, or in combination, controller 520 may adjust, adapt, or modify one or more parameters to reduce the influence or effect of the feedback signal provided by primary HEGO sensor 530 while increasing the influence or effect of the signal provided by monitoring HEGO sensor 532 as the catalyst ages. For example, a control equation may be represented by:

$$y = A*UEGO + B*HEGO_1 + C*(HEGO_1 - HEGO_2)$$

or alternatively:

$$y = A*UEGO + B*HEGO_1 + C*HEGO_2$$

where A represents an adjustable gain or scaling factor for the signal provided by the UEGO sensor, B represents an adjustable gain or scaling factor for the signal provided by the primary HEGO sensor ($HEGO_1$) and, C represents an adjustable gain or scaling factor for the difference between the signals of the primary HEGO sensor ($HEGO_1$) and the monitoring HEGO sensor ($HEGO_2$). The gains or scaling factors may then be adjusted based on the performance of the catalyst to provide the desired control as the catalyst dynamics change.

FIG. 6 is a graph of catalyst oxygen storage capacity as a function of catalyst temperature for use in monitoring catalyst performance according to one embodiment of the present invention. Four sets of data represented by data points 600, 602, 604, and 608 were obtained under various engine/vehicle operating conditions with a properly functioning catalyst. The oxygen storage capacity of the catalyst was determined based on various operating parameters, such as mass airflow, catalyst space velocity, engine speed, engine load, and catalyst temperature, for example, and plotted as a function of the catalyst temperature. As the data sets of FIG. 6 illustrate, the oxygen storage capacity of the catalyst generally increases with increasing catalyst temperature. This type of information can then be used to determine acceptable operating limits or thresholds to monitor operation of the catalyst(s) on-line. Oxygen storage data obtained at various temperatures and engine operating conditions provides results that are robust against noise factors.

FIG. 7 is a graph of catalyst gain as a function of catalyst temperature for use in monitoring catalyst performance according to one embodiment of the present invention. Rather than calculating the oxygen storage capacity based on various engine operating parameters as described with reference to FIG. 6 to determine the health of the catalyst on-line, the catalyst gain, which correlates to the inverse oxygen capacity of the catalyst, may be determined or estimated based on the input and output air fuel ratios measured by corresponding exhaust gas sensors as described in detail above. For example, in the embodiment illustrated in FIG. 5, an estimated catalyst gain may be determined using UEGO sensor 508 and primary HEGO sensor 530, using UEGO sensor 508 and monitoring HEGO sensor 532, and/or using UEGO sensor 508 and a combined signal from primary HEGO sensor 530 and monitoring HEGO sensor 532.

Curve 700 of FIG. 7 represents catalyst gain as a function of temperature for a properly functioning catalyst. Line 702 represents a lower catalyst operating temperature for monitoring or evaluating catalyst performance while line 704 represents an upper catalyst operating temperature for evaluating catalyst performance. As the catalyst dynamics change due to aging or other factors and the catalyst exhibits less oxygen storage capacity, the catalyst gain will increase as represented by curve 710. One or more thresholds or limits as represented by curve 712 may be used to evaluate the current performance of the catalyst. When a particular catalyst gain threshold or limit is exceeded, appropriate action may be taken, such as modifying the engine control and/or providing diagnostic information to the operator and/or service personnel, for example.

Figure 8:
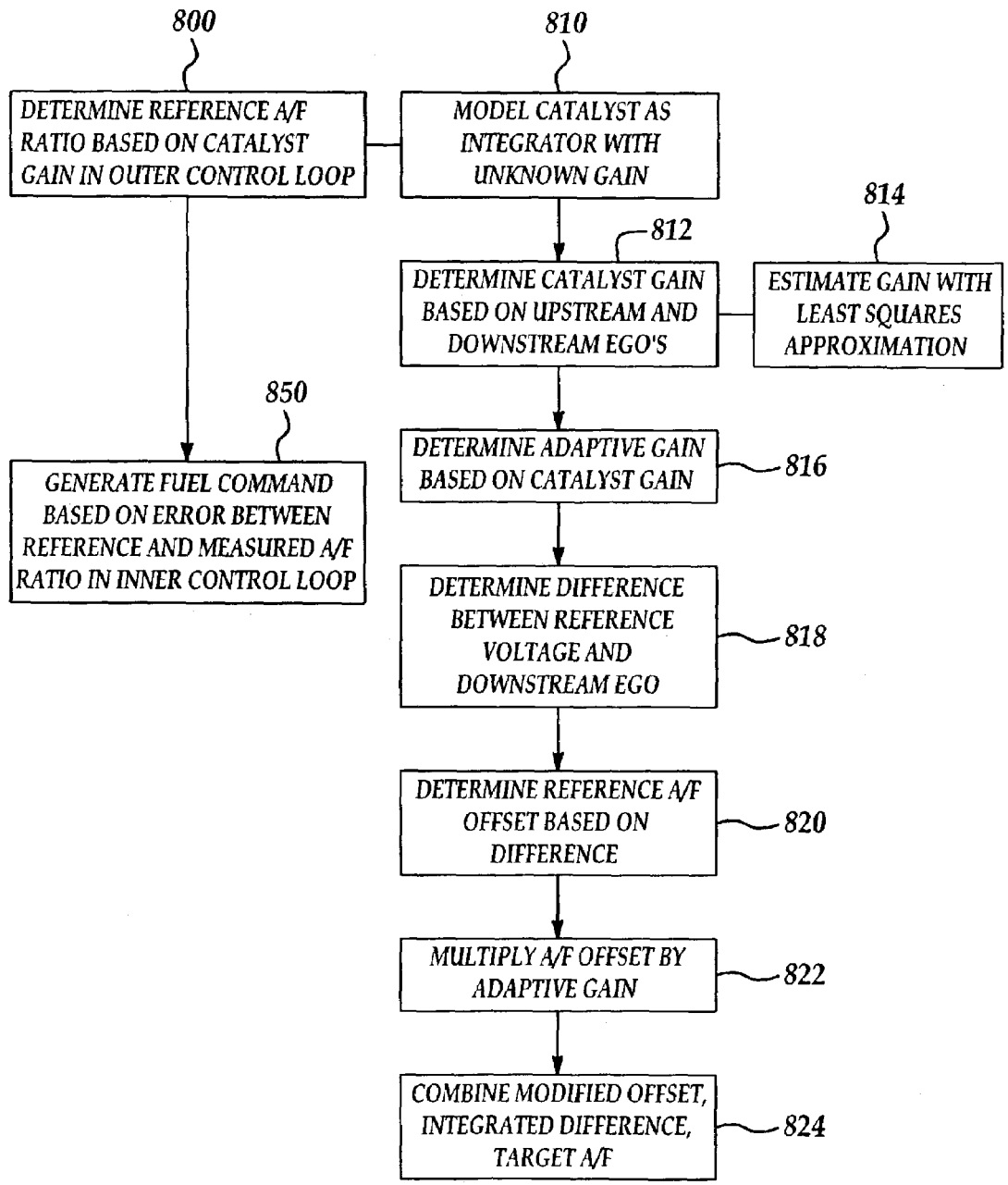
FIG. 8 is a flow chart illustrating operation of a system or method for controlling an internal combustion engine according to one embodiment of the present invention.

FIG. 8 is a flow chart illustrating operation of a system or method for controlling an internal combustion engine according to one embodiment of the present invention. As with the block diagrams of FIGS. 1–3, and 5, the flow chart illustrates operation of representative embodiments of a system and method for controlling and monitoring an internal combustion engine according to the present invention. As will be appreciated by one of ordinary skill in the art, the diagrams and flow charts represent any of a number of known processing strategies such as event-driven, interrupt-driven, multi-tasking, multi-threading, and the like. As such, various steps or functions illustrated may be performed in the sequence illustrated, in parallel, or in some cases omitted. Although not explicitly illustrated, one of ordinary skill in the art will recognize that one or more of the illustrated steps or functions may be repeatedly performed. Similarly, the order of processing is not necessarily required to achieve the objects, features, and advantages of the invention, but is provided for ease of illustration and description. Preferably, the control logic illustrated is implemented in software executed by a microprocessor-based vehicle, engine, and/or powertrain controller, such as controller 22 (FIG. 1). Of course, the control logic may be implemented in software, hardware, or a combination of software and hardware depending upon the particular application. When implemented in software, the control logic is preferably provided in one or more computer-readable storage media having stored data representing code or instructions executed by a computer to monitor and control the engine. The computer-readable storage media may be any of a number of known physical devices which utilize electric, magnetic, optical and/or combination storage to keep executable instructions and associated calibration information, operating variables, and the like.

As represented by block 800 of FIG. 8, a reference air/fuel (A/F) ratio is determined based on a catalyst gain in an outer control loop. The catalyst is modeled as an integrator with an unknown gain as represented by block 810. The catalyst gain is determined based on signals provided by an upstream exhaust gas oxygen (EGO) sensor that detects feedgas oxygen, and a downstream EGO that detects oxygen downstream of the catalyst as represented by block 812. The catalyst gain may be determined using any of a number of known estimation techniques, including a polynomial approximation such as a least squares approximation as represented by block 814.

An adaptive gain factor is determined based on the estimated catalyst gain as indicated by block 816. In one embodiment, the adaptive gain is stored in a look-up table referenced or indexed by the catalyst gain with values ranging between about zero and unity. The signal from the downstream EGO is compared to a reference voltage to determine a difference or control error as represented by block 818. In one embodiment, the reference voltage is between about 0.6 and 0.7 volts with the downstream sensor being a HEGO sensor. An offset for the reference A/F ratio is then determined based on the difference or error as represented by block 820. In one embodiment, a relay block is used to select one of two values based on the sign of the error or sign of the difference. The offset is then multiplied by the adaptive gain as represented by block 822 to adapt the control effort to the current oxygen storage capacity of the catalyst. The modified offset is then combined with the integral of the error or difference and a target air/fuel ratio to produce the reference air/fuel ratio as represented by block 824. In one embodiment, the integrator applied to the error or difference is limited to avoid integrator wind-up.

The reference A/F ratio determined by the outer control loop as represented by block 800 is provided to an inner control loop, which generates a fuel command based on an error between the reference A/F ratio and the measured A/F ratio as determined by the upstream EGO as represented by block 850.

As such, the present invention provides a robust engine controller that adapts to changing catalyst dynamics on-line. The invention allows use of a relatively simple catalyst model that captures the catalyst behavior to provide on-line calculation of the catalyst gain for real-time updates in the engine controller. The robust control and management of catalyst conversion efficiency afforded by the present invention may allow reduction of the catalyst volume with corresponding savings in cost and weight.

While the best mode for carrying out the invention has been described in detail, those familiar with the art to which this invention relates will recognize various alternative designs and embodiments for practicing the invention as defined by the following claims.

What is claimed:

1. A method for controlling an internal combustion engine, the method comprising:
   determining a catalyst gain based on signals from a first exhaust gas sensor positioned upstream relative to a catalyst and a second exhaust gas sensor positioned downstream relative to at least a portion of the catalyst by modeling the catalyst as an integrator with an unknown gain and estimating the catalyst gain;
   determining a reference air/fuel ratio based on the catalyst gain; and
   generating a fueling command such that an actual air/fuel ratio approaches the reference air/fuel ratio.

2. The method of claim 1 wherein the step of estimating the catalyst gain comprises:
   estimating the catalyst gain using recursive least squares.

3. The method of claim 1 further comprising:
   positioning the second exhaust gas sensor upstream relative to at least a portion of the catalyst.

4. The method of claim 1 further comprising:
   determining an adaptive gain based on the catalyst gain, wherein the step of determining the reference air/fuel ratio includes determining the reference air/fuel ratio based on the adaptive gain.

5. The method of claim 4 further comprising
   determining a difference between a signal from the second exhaust gas sensor and a reference signal;
   selecting an air/fuel ratio offset based on the difference; and
   applying the adaptive gain to the selected air/fuel ratio offset.

6. The method of claim 4 further comprising:
   determining a difference between a signal from the second exhaust gas sensor and a reference signal;
   selecting an air/fuel ratio offset based on the difference;
   applying the adaptive gain to the offset to provide an adaptive offset;
   integrating the difference between the signal from the second exhaust gas sensor and the reference signal; and
   combining the difference after integrating with the adaptive offset to determine the reference air/fuel ratio.

7. The method of claim 6 wherein the step of generating a fueling command comprises:
   generating a fueling command to reduce the difference between a signal from the first exhaust gas sensor and the reference air/fuel ratio.

8. A method for controlling an internal combustion engine, the method comprising:
   controlling air/fuel ratio of the engine using an inner feedback control loop based on a reference air/fuel ratio and feedback from an universal exhaust gas oxygen sensor positioned upstream relative to a catalyst;
   determining a catalyst gain based on the universal exhaust gas oxygen sensor and the heated exhaust gas oxygen sensor by modeling the catalyst as an integrator with an unknown gain and estimating the catalyst gain; and
   generating the reference air/fuel ratio in an outer feedback control loop based on feedback from a heated exhaust gas oxygen sensor and a sensor reference voltage to reduce any error therebetween, the heated exhaust gas oxygen sensor being positioned downstream relative to a first portion of the catalyst and upstream relative to a second portion of the catalyst.

9. The method of claim 8 further comprising:
determining an adaptive gain based on the catalyst gain.

10. The method of claim 8 wherein the step of determining a catalyst gain comprises:
estimating the catalyst gain using a polynomial approximation.

11. The method of claim 8 wherein the step of generating the reference air/fuel ratio comprises:
determining a catalyst gain based on signals from the universal exhaust gas oxygen sensor and the heated exhaust gas oxygen sensor;
determining an adaptive gain factor based on the catalyst gain;
determining a difference between a sensor reference voltage and a signal from the heated exhaust gas oxygen sensor;
determining an air/fuel ratio offset based on the difference;
applying the adaptive gain factor to the air/fuel ratio offset to produce an adaptive air/fuel ratio offset;
combining an integral of the difference, the adaptive air/fuel ratio offset, and an air/fuel ratio target value to generate the reference air/fuel ratio signal.

12. The method of claim 11 wherein the step of determining an air/fuel ratio offset comprises determining an air/fuel ratio offset based on the sign of the difference between the reference voltage and the heated exhaust gas oxygen sensor signal.

13. The method of claim 11 wherein the step of determining an air/fuel ratio offset selects one of two offsets based on the difference.

14. A system for controlling a multiple cylinder internal combustion engine, the system comprising:
a first exhaust gas sensor positioned downstream relative to the engine;
a catalyst positioned downstream relative to the first exhaust gas sensor;
a second exhaust gas sensor positioned downstream relative to the first exhaust gas sensor and downstream relative to at least a portion of the catalyst; and
a controller in communication with the first and second exhaust gas sensors, the controller having an inner feedback control loop to control air/fuel ratio of the engine with feedback provided by the first exhaust gas sensor and an outer feedback control loop that modifies a reference air/fuel ratio provided to the inner feedback control loop based on feedback provided by the first and second exhaust gas sensors wherein the reference air/fuel ratio adapts to oxygen storage capacity of the catalyst by estimating a catalyst gain based on the first and second exhaust gas sensors and modifying a reference air/fuel ratio offset based on the catalyst gain.

15. The system of claim 14 wherein the controller determines an adaptive gain based on the catalyst gain and modifies the offset based on the adaptive gain.

16. The system of claim 14 wherein the second exhaust gas sensor is positioned upstream relative to a portion of the catalyst.

17. The system of claim 14 wherein the catalyst comprises a plurality of catalyst elements and wherein the second exhaust gas sensor is positioned downstream relative to a first one of the plurality of catalyst elements.

18. The system of claim 14 wherein the catalyst comprises:
a close-coupled catalyst positioned near an engine exhaust manifold; and
an underbody catalyst positioned downstream relative to the close-coupled catalyst, wherein the second exhaust gas sensor is positioned between the close-coupled catalyst and the underbody catalyst.

19. The system of claim 14 wherein the first exhaust gas sensor provides a signal proportional to oxygen content of exhaust gas upstream of the catalyst.

20. The system of claim 19 wherein the first exhaust gas sensor comprises a universal exhaust gas oxygen sensor.

21. The system of claim 19 wherein the second exhaust gas sensor provides a signal indicative of a relative air/fuel ratio.

22. The system of claim 21 wherein the second exhaust gas sensor comprises a heated exhaust gas oxygen sensor.

23. A computer readable storage medium having stored data representing instructions executable by a computer to control an internal combustion engine having a first exhaust gas oxygen sensor, a catalyst positioned downstream from the first exhaust gas oxygen sensor, and a second exhaust gas oxygen sensor positioned downstream relative to at least a portion of the catalyst, the computer readable storage medium comprising:
instructions for modeling the catalyst as an integrator and determining a catalyst gain based on signals from the first and second exhaust gas oxygen sensors;
instructions for determining an adaptive gain based on the catalyst gain;
instructions for determining a reference air/fuel ratio offset based on a difference between a reference voltage and the second exhaust gas oxygen sensor;
instructions for modifying the air/fuel ratio offset based on the adaptive gain and a target air/fuel ratio to determine a reference air/fuel ratio; and
instructions for generating a fueling command for the engine such that an engine air/fuel ratio approaches the reference air/fuel ratio.

24. The computer readable storage medium of claim 23 wherein the instructions for determining the catalyst gain include instructions for computing a least squares approximation of the catalyst gain.

* * * * *